United States Patent [19]

Heidel et al.

[11] Patent Number: 5,219,971
[45] Date of Patent: Jun. 15, 1993

[54] PROCESS FOR THE PREPARATION OF FINE-PARTICLE, WATER-SWELLABLE POLYSACCHARIDE GRAFT COPOLYMERS

[75] Inventors: Klaus Heidel, Marl; Frank Zimmermann, Recklinghausen, both of Fed. Rep. of Germany

[73] Assignee: Starchem GmbH, Krefeld, Fed. Rep. of Germany

[21] Appl. No.: 822,200

[22] Filed: Jan. 17, 1992

[30] Foreign Application Priority Data

Feb. 19, 1991 [DE] Fed. Rep. of Germany ....... 4105000

[51] Int. Cl.$^5$ .................... C08F 251/00; C08F 2/18; A61L 15/22
[52] U.S. Cl. .................... 527/314; 527/311; 527/312; 527/313; 527/315
[58] Field of Search ................ 527/311, 312, 314, 315

[56] References Cited

U.S. PATENT DOCUMENTS

| | | | |
|---|---|---|---|
| 4,777,232 | 10/1988 | Heidel | 527/314 |
| 5,032,659 | 7/1991 | Heidel | 527/300 |

*Primary Examiner*—Nathan M. Nutter
*Attorney, Agent, or Firm*—Oblon, Spivak, McClelland, Maier & Neustadt

[57] ABSTRACT

Fine-particle, water-swellable polysaccharide graft copolymers by prepared inverse suspension polymerization of 5 to 40 parts of polysaccharide and 95 to 60 parts of an olefinically unsaturated carboxylic acid, in which an aqueous phase which contains the olefinically unsaturated carboxylic acid, polymerization initiator and 100 to 75 wt. % of the polysaccharide is metered into a hydrophobic solvent which contains 0 to 25 wt. % of the polysaccharide at 40° to 100° C., exhibit improved absorptivity properties and particle size distribution.

24 Claims, No Drawings

PROCESS FOR THE PREPARATION OF FINE-PARTICLE, WATER-SWELLABLE POLYSACCHARIDE GRAFT COPOLYMERS

BACKGROUND OF THE INVENTION

1. Field of the Invention

The present invention relates to a novel process for the preparation of fine-particle, porous and rapidly water-swellable polysaccharide graft copolymers. These polymers are prepared by inverse suspension polymerization and crosslinking. The present invention also relates to the polysaccharide graft copolymers prepared by the present process.

2. Discussion of the Background

Water-absorbing polymers are used for a wide variety of purposes in the sanitary and hygiene sectors as water-absorbing agents in disposable diapers and paper towels, as tampons, undersheets for patients, electrolyte thickeners in dry batteries, as moisture retainers or water stores in agriculture, and as desiccants.

Suitable polymers are derivatized polysaccharides, usually grafted with water-soluble vinyl monomers, such as carboxymethyl cellulose, hydrolyzed starch/acrylonitrile graft copolymers, acrylic acid/starch graft copolymers, or completely synthetic, slightly crosslinked polymers such as partially crosslinked polyacrylic acid salts or partially crosslinked polymaleic acid derivatives.

Incorporation of starch in water-soluble graft copolymers makes it possible, compared with completely synthetic polymers, to adjust particular product properties. Thus, the porosity of the polymer particles is raised, the absorption is increased, and the biodegradability is improved.

Preparation of graft copolymers by direct grafting of starch with acrylate in aqueous solution is not straightforward industrially. Previous swelling of the starch is necessary in order to obtain the maximum homogeneity of dispersion, which is necessary for the grafting, of starch in the aqueous monomer solution. This considerably increases the viscosity of the monomer solution, and a paste-like consistency is obtained when more than about 10% starch is used.

DE-C 26 12 846 discloses the preparation of water-absorbing graft copolymers by grafting water-soluble monomers, such as acrylic acid, onto starch in the presence of a crosslinking agent. The grafting reaction is carried out in aqueous solution or in aqueous/alcoholic medium as so-called precipitation polymerization. This process results, in the case of grafting in aqueous solution, in rubber-like gels which cannot be stirred and from which final products in the form of powders are obtained only after drying and milling. By contrast, if a grafting is carried out as precipitation polymerization in the presence of an approximately 20-fold excess of alcohol as precipitant, the resulting fine-particle products have only moderate liquid absorption capacity.

According to Japanese Patent Specification 80/139 408, a graft copolymer can be prepared by polymerization of acrylonitrile in aqueous medium in the presence of starch and can subsequently be hydrolyzed and crosslinked. The result is a powder with a water absorption capacity of 150 to 180 ml/g.

Fine-particle water-absorbing polymers can be prepared by polymerization of partially neutralized acrylic acid in inverse suspension, also called reverse phase suspension. This entails a water-soluble monomer in the form of an aqueous solution being emulsified in a hydrophobic medium in the presence of a dispersant and polymerized to a fine-particle final product. In the presence of a polysaccharide such as starch, it is possible in this way to obtain water-soluble or water-insoluble, swellable graft copolymers.

A graft copolymerization in inverse suspension is indicated in Japanese Patent Specification 80/161 813. This entails initially making up a mixture of n-hexane with sorbitan monostearate, starch, water, acrylic acid, sodium hydroxide solution and water-soluble initiator, before initiating the polymerization by heating. However, in this case, the reaction product tends to aggregate during the polymerization and does not give a fine-particle product.

According to DE-C-28 40 010 it is possible to prepare water-soluble polysaccharide graft copolymers by inverse suspension polymerization, preferably in a batch process. This entails a polysaccharide being initially suspended in a solvent which is immiscible with water in the presence of a surface-active agent. Subsequently, an aqueous monomer solution which contains predominantly acrylamide or a cationic monomer, and can also have small amounts of acrylic acid, is added at room temperature. Addition of an initiator is followed by heating and polymerization. The solids contents, based on the aqueous polymerization mixture, are above 50%.

In this case, no crosslinking agents are employed and no water-swellable gel-like polymers are obtained. The indicated batchwise preparation process leads at the start of the polymerization to temperature peaks which are difficult to control in large batches.

In EP-B-0 083 022, acrylic acid is polymerized in the presence of starch in aqueous solution. The products can then be crosslinked in an inert solvent in the presence of 0.01 to 1.3 parts of water per part of resin. The preparation of the starch graft copolymer takes place at a solids content of only 20%. In addition, these starch graft copolymers - crosslinked or uncrosslinked-have only a low water absorption capacity.

According to DE-A-38 01 633, polysaccharide graft copolymers are prepared by inverse suspension polymerization, partial removal of water and crosslinking. The inverse suspension polymerization is carried out in one stage and batchwise by first mixing all the reaction components and then initiating the polymerization by heating in the presence of an initiator. In this case there is violent evolution of heat at the start of the polymerization. In industrial production reactors it is often possible only with difficulty to ensure sufficiently rapid dissipation of the heat of polymerization.

Thus, there remains a need for a process to produce fine-particle, water-swellable polysaccharide graft copolymers, which is free of the above-described drawbacks. There also remains a need for polysaccharide graft copolymers with improved particle fineness and absorptivity and liquid-retention properties.

SUMMARY OF THE INVENTION

Accordingly, one object the present invention is to provide a novel process for the preparation of polysaccharide graft copolymers, which are prepared from 5 to 40 parts by weight of polysaccharide and 95 to 60 parts by weight of an olefinically unsaturated carboxylic acid, which yields polysaccharide graft copolymers exhibiting improved particle fineness and absorptivity for urine.

It is another object of the present invention to provide a process for the preparation of polysaccharide graft copolymers, which are prepared from 5 to 40 parts by weight of polysaccharide and 95 to 60 parts by weight of an olefinically unsaturated carboxylic acid, which possess a high level of liquid-retention capacity.

It is another object of the present invention to provide the improved polysaccharide graft copolymers prepared by such processes.

These and other objects, which will become apparent in the course of the following detailed description, have been achieved by carrying out an inverse suspension polymerization in which an aqueous phase which contains the olefinically unsaturated carboxylic acid, polymerization initiator and 100 to 75 percent by weight of the polysaccharide is metered into a hydrophobic solvent which contains 0 to 25 per cent by weight of the polysaccharide as dispersion at 40° to 100° C.

DETAILED DESCRIPTION OF THE PREFERRED EMBODIMENTS

Thus, the present invention relates to processes in which 5 to 40 parts by weight of polysaccharide are graft copolymerized with 95 to 60 parts by weight of an olefinically unsaturated carboxylic acid, by inverse suspension polymerization. An aqueous phase containing the olefinically unsaturated carboxylic acid, polysaccharide (100 to 75 wt. %), and possibly a polymerization initiator is metered into a hydrophobic solvent in which 0 to 25 wt. % of the polysaccharide is dispersed.

Preferably used for the inverse suspension polymerization are 10 to 20 parts by weight of polysaccharide and 90 to 80 parts by weight of the olefinically unsaturated carboxylic acid, with preferably 2 to 20 percent by weight of the polysaccharide being dispersed in the hydrophobic solvent, and 98 to 80 percent by weight of the polysaccharide being added in the aqueous phase.

Polysaccharides suitable for the process according to the present invention are starches, starch derivatives and cellulose derivatives. Starches are preferred in this connection. It is possible to use natural starches from potatoes, maize, wheat, rice or tapioca roots, as well as wax maize or high amylose starch, and derivatives thereof, such as, for example, ethers and esters of starch. Also suitable are thin-boiling starches, which usually consist of starches which have undergone slight hydrolytic or oxidative breakdown. Preferred in this connection are starches with a viscosity of 20 to 25,000 mPa.s, preferably 30 to 20,000 mPa.s, measured for a 10 wt. % strength aqueous paste at 20° C.

Hydrophobic solvents which can be used for the organic phase are ethers, halogenated hydrocarbons or hydrocarbons with 6 to 12 C atoms. Preferably used are aliphatic or alicyclic hydrocarbons such as cyclohexane, n-hexane, $C_8$-isoparaffins or industrial petroleum fractions such as petroleum spirit, ligroin, white spirit or solvent-naphtha, with an aromatic content up to 20 wt. % and a boiling point in the range from 50° to 200° C. The ratio of organic phase to aqueous solution is usually 1.3:1 to 4:1 by weight, preferably 1.5:1 to 3:1 by weight.

Preferably used as dispersant is a non-ionic surfactant with a hydrophilic/lipophilic balance (HLB) of 0.5 to 10, which ought to be at least partially soluble in the organic solvent. Suitable examples are lipophilic sorbitan esters such as sorbitan monolaurate, sorbitan monopalmitate or sorbitan monooleate.

It is also possible to use satisfactorily polyetheresters such as polyethylene glycol (200) monooleate, polyethylene glycol (200) monolaurate or polyethylene glycol (300) oleate. It is also possible to use cellulose ethers such as ethylcellulose, or ethylhydroxyethylcellulose.

It is advantageous also to use a non-ionic dispersant which is predominantly water-soluble and has an HLB of 10.5 to 20. Examples of such substances are water-soluble polyethylene glycols with a molecular weight of 200 to 20,000, in particular of 400 to 5,000, also polyethylene glycol ethers composed of an aliphatic monohydric alcohol with 6 to 20 C atoms and a polyethylene glycol with 3 to 30, in particular with 4 to 20, ethylene oxide units.

Also suitable are commercially available $C_{12}$-fatty alcohol polyglycol ethers with 7 to 19 ethylene oxide units and an HLB of 13 to 18. Furthermore suitable are polyoxyethylenesorbitan fatty acid esters such as, for example, polyoxyethylene sorbitan monolaurate or polyoxyethylene sorbitan monooleate.

In a preferred embodiment, the dispersant is a mixture consisting of 50 to 90 percent by weight of non-ionic surfactant with an HLB of 0.5 to 10 and of 10 to 50 percent by weight of non-ionic surfactant with an HLB of 10.5 to 20.

The content of dispersant mixture is 1 to 10 percent by weight based on the weight of the olefinically unsaturated carboxylic acid. It is preferable in this connection for 10 to 60 percent by weight of the dispersant mixture to be present in the organic phase and for 90 to 40 percent by weight to be metered in with the aqueous phase.

The olefinically unsaturated carboxylic acids have 3 to 10 carbon atoms. Examples of these are acrylic acid, methacrylic acid, crotonic acid, tiglic or angelic acid. Acrylic and methacrylic acids are preferably used. The acids can be neutralized or partially neutralized with alkali metal or ammonium hydroxide solutions. Sodium hydroxide solution is preferably used for this purpose. Acrylic acid and methacrylic acid which are 50 to 90% neutralized are very particularly preferred. The aqueous solutions of the unsaturated carboxylic acids usually have a solids content, including the polysaccharide content, in the range from 20 to 80 wt. %, preferably 30 to 70 wt. %, based on the total weight of the solution.

Besides the unsaturated carboxylic acids, it is possible to use up to 20 parts by weight of other olefinically unsaturated monomers such as acrylamide, methacrylamide, Na salt of 2-acrylamido-2-methylpropanesulphonic acid, 2-methacryloylethanesulphonic acid, 2-hydroxyethyl acrylate, 2-hydroxyethyl methacrylate, N,N-dimethylaminoethyl acrylate or methacrylate, or the quaternary ammonium salts thereof, in the form of their aqueous solution for the polymerization.

The aqueous phase which is added to the polysaccharide suspension for the polymerization can also contain up to 2 parts by weight of completely or predominantly water-soluble crosslinking agents. Suitable are vinyl compounds such as N,N-methylenebisacrylamide, 1,4-butanediol di(meth)acrylate, ethanediol di(meth)acrylate, diallyl maleate, glycidyl (meth)acrylate, allyl methacrylate, polyethylene glycol(450) dimethacrylate, or polyepoxides such as, for example, ethylene glycol diglycidyl ether, polyethylene glycol diglycidyl ether, glycerol triglycidyl ether or diglycerol tetraglycidyl ether.

The aqueous phase can also contain up to 20 parts by weight of hydrophobic solvent.

Conventional polymerization initiators are used for the graft copolymerization. Suitable examples are ammonium, sodium or potassium peroxodisulfate and corresponding peroxomonosulfates, dibenzoyl peroxide, dilauroyl peroxide, di-2-ethylhexyl peroxodicarbonate, dicyclohexyl peroxodicarbonate, tert-butyl perpivalate, tert-butyl perbenzoate, tert-butyl permaleate, tert-butyl hydroperoxide, di-tert-butyl peroxide, hydrogen peroxide and redox catalysts, suitable reducing components being ascorbic acid, sodium methylsulphinate, disodium sulphite and sodium bisulphite. Also suitable are azo initiators such as azobisisobutyronitrile, 2,2-azobis(2-amidinopropane) dihydrochloride, 2,2'-azobis(4-cyanopentanoic acid) and 2-carbamoylazoisobutyronitrile.

The initiators can be added in the aqueous phase of the unsaturated carboxylic acid to the polysaccharide suspension. However, it is also possible, and has advantages, to meter them in as separate aqueous solutions. It is also possible for part of the initiator to be present in the organic phase and another part to be added with the aqueous phase of the unsaturated carboxylic acid. In general, 0.005 to 5 parts by weight of initiator, based on the weight of the unsaturated carboxylic acid, are introduced via an aqueous phase and 0 to 1 part by weight of initiator, based on the weight of the unsaturated carboxylic acid, is introduced via the organic phase. It is preferable for 0.05 to 1.5 parts by weight of initiator to be metered in in an aqueous phase, and 0.03 to 0.5 part by weight of initiator to be present in the organic phase.

Potassium and ammonium peroxodisulfates are preferably used.

The polysaccharide suspension and aqueous phase can additionally contain conventional auxiliaries and additives such as foam suppressants and complexing agents. Thus, for example, nitrilotriacetate, ethylenediaminetetraacetate or diethylenetriaminepentaacetate can be added in order to complex traces of iron. Suitable antifoaming agents are described in *Ash et al, Handbook of Industrial Chemical Additives*, VCH Publishers, New York (1991), which is incorparated herein by reference.

The polymerization is preferably carried out at 50° to 75° C. This then entails the hydrophobic phase being heated to 50° to 75° C., while the aqueous phase with the unsaturated carboxylic acid usually has a temperature of 15° to 40° C. The reaction is generally complete after 0.5 to 5 hours.

The metering of the aqueous phase into the hydrophobic solvent may be carried by any conventional metering method using any conventional apparatus, such as dropwise or portionwise addition of the aqueous phase to the hydrophobic solvent. Typically, the aqueous phase is added to the hydrophobic solvent over a period of time of from 0.5 to 4 hrs., preferably 0.5 to 2 hrs., while constantly stirring the hydrophobic solvent. After the metering of the aqueous phase is complete, the reaction mixture may be maintained at the reaction temperature with continued stirring for an additional 0.1 to 1 hr.

The inverse suspension polymerization results in a suspension of separate water-swollen polymer particles which preferably have a solids content of 30 to 60% based on the total weight of polymer and water.

Crosslinking can be carried out before, during or after the polymerization. It is preferable to carry out a partial removal of water and a subsequent crosslinking after the polymerization is complete. The partial removal of water preferably establishes a residual water content of 10 to 50% based on the total of polymer and water. Residual water contents of 10 to 30% are very particularly preferably established thereby. The partial removal of water is generally carried out at 50° to 100° C. by azeotropic distillation during which it is also possible to apply a vacuum. It is possible in this connection to use conventional water-removal apparatus in which the organic phase is recycled.

During or after the partial removal of water it is possible to carry out a subsequent crosslinking by the addition of, preferably, 0.005 to 5 percent by weight, most preferably 0.01 to 1 percent by weight, of crosslinking agent based on the weight of the graft copolymer. It is preferable to carry out first the partial removal of water and then the subsequent crosslinking. Epoxides are preferably used for the subsequent crosslinking. Suitable in this connection are, inter alia, polyglycidyl ethers such as, for example, ethylene glycol diglycidyl ether, polyethylene glycol diglycidyl ether, glycerol triglycidyl ether and diglycerol tetraglycidyl ether. It is also possible to use polyaldehydes such as glyoxal, or halo epoxy compounds such as epichlorohydrin. These crosslinking agents are expediently added in aqueous or organic solution. The subsequent crosslinking is carried out by heating at 50° to 100°, with heating at 60° to 80° C. being preferred. The crosslinking reaction is complete after 0.5 to 4 hours.

The starch graft copolymers resulting after the crosslinking take the form of porous particles in the form of a free-flowing powder. The particles can easily be separated from the continuous organic phase, for example by filtration or centrifugation. They can subsequently be dried by conventional processes, for example in vacuo or by use of a fluidized-bed, tumbler or paddle dryer, to give the product in the form of a powder. The filtrate can be reused in the next polymerization batch. Solvent and water can also be separated from the polymer powder by distillation.

No temperature peaks and no high viscosities occur during the polymerization according to the present invention. The preparation process can therefore be carried out satisfactorily on the pilot plant and production scale.

The present polymerization results an a uniformly fine product with a narrow particle size distribution. The formation of coarse-particle agglomerates and deposits is very low.

The term fine-particle is defined, within the meaning of this invention, as products with particle sizes below 2 mm, and more than 85 percent by weight of the products ought to have particle sizes below 1,000 $\mu m$.

The products display rapid and high liquid absorption. The liquid retention capacity is very high even under pressure. On incorporation of the polymers in hygiene articles such as, for example, diapers, only little rewetting occurs.

The products are especially suitable for incorporation in cellulose-containing absorbent hygiene articles such as disposable diapers, sanitary towels, wiping towels and undersheets for patients. They can be used as desiccants, as swelling agents in sealing compositions, as thickening agents and as water stores or moisture retainers in agriculture.

The process according to the present invention is carried out in a preferred embodiment in such a way that a portion of the polysaccharide is dispersed by stirring in the hydrophobic solvent in a stirred vessel with the aid of a non-ionic surfactant and heated to the required polymerization temperature. Subsequently an aqueous monomer solution which contains the unsaturated carboxylic acid, the remaining polysaccharide, non-ionic surfactant, polymerization initiator, where appropriate a crosslinking agent and minor amounts of a hydrophobic solvent is metered in. Polymerization with grafting takes place during this. After the polymerization, part of the water is removed by azeotropic distillation with a water trap. Subsequent crosslinking is then carried out, and it is then possible to separate the polymer as fine-particle product.

Other features of the invention will become apparent in the course of the following descriptions of exemplary embodiments which are given for illustration of the invention and are not intended to be limiting thereof.

EXAMPLES

Liquid retention capacity 0.500 g of polymer is mixed with 70 ml of synthetic urine (mixture of 3,883 g of distilled water, 33.2 g of NaCl, 4.0 g of $MgSO_4.7H_2O$, 2.4 g of $CaCl_2$, and 77.6 g of urea) in a 100 ml centrifuge tube and stirred gently while swelling for one hour. The gel phase is then removed from the sol phase by centrifugation at 4,500 rpm, for 0.5 hour and weighed.

$$\text{Absorption capacity} = \frac{\text{final weight of gel} - \text{initial weight of gel}}{\text{initial weight of gel}} \ (g/g)$$

Absorptivity 0.100 g of polymer is spread on a glass frit (type G3, diameter 3 cm) which is connected to a burette filled with synthetic urine and is levelled at the level of the glass frit. The absorbed amount of liquid is measured o the burette after 0.5 and 5 minutes.

$$\text{Absorptivity} = \frac{\text{absorbed amount of liquid}}{\text{initial weight of gel}} \ (g/g)$$

The initial value after 0.5 minute characterizes the absorption rate. The final value after 5 minutes is a measure of the absorption capacity.

The highest possible values are generally desirable. For absorption capacity, the term "moderate" is applied to a range from 10 to 19 g/g, "high" to a range from 20 to 24, and "very high" to a range from 25 to 30 g/g.

A model diaper test is carried out as follows for testing the products in cellulose-containing hygiene articles:

Liquid spread and rewetting in a model diaper as described in Edana Nordic Nonwovens Symposium, June 1988, page 242.

Rectangular pieces 14×38 cm in size are cut out of an incontinence pad (Caducee Slipad, supplied by Molnlycke GmbH, D-4010 Hilden) consisting of two layers of cellulose fluff. The covering nonwoven (coverstock) consisting of polypropylen is replaced by a cellulose nonwoven. 5.0 g of polymer is scattered in a uniform distribution over the entire cross-section between the two layers of fluff.

Into the middle of the model diaper are initially placed 60 ml and on two occasions, after 30 minutes each time, a further 30 ml of red-stained synthetic urine. 30 minutes after the last dose of liquid, 80 sheets of paper towels (Apura Ecotex), whose dry weight has been determined beforehand, are placed on the model diaper and loaded with a weight of 21.3 kg (=4 $kg/dm^2$) for 10 minutes. The wet paper towels are then reweighed.

Rewetting (g) = weight of moist paper towels (g) − weight of dry paper towels (g)

The better the liquid retention capacity the lower the measurements for the rewetting. The following classification is undertaken:

| Rewetting | | |
|---|---|---|
| | 40 to 45 g: | very good |
| | 46 to 50 g: | good |
| | 51 to 60 g: | moderate |
| | 70 (blank): | no effect |

The yields in g indicated in the examples always relate to products which have been dried in a vacuum drying oven (15 mbar vacuum) at 50° C. for 24 hours to a residual moisture content <7 per cent by weight.

The indicated viscosities of the starches relate to 10% strength aqueous pastes at 20° C.

EXAMPLE 1

2,400 ml of cyclohexane are placed in a 4 l glass reactor equipped with stirrer, nitrogen inlet, metering devices, and water trap and heated to 70° C. While stirring at 400 rpm,

| | |
|---|---|
| 4 g | of natural maize starch (supplied by Cerestar, D-4150 Krefeld), |
| 4 g | of sorbitan monolaurate (SPAN ® 20 supplied by Atlas, Wilmington, Del., USA), |
| 2 g | of polyethylene glycol with a molecular weight of 1,550 (POLYDIOL 1550 supplied by Hüls AG, D-4370 Marl), |
| 0.25 g | of ammonium peroxodisulfate in 30 ml of water, and |
| 50 mg | of ethylenediaminetetraacetate (Na salt) are dispersed. |

Oxygen is then displaced by nitrogen, and a mixture of

| | |
|---|---|
| 312 g | of acrylic acid, |
| 480 g | of 25 wt. % strength sodium hydroxide solution, |
| 42 g | of natural maize starch, |
| 12 g | of sorbitan monolaurate, |
| 0.1 g | of trimethylolpropane triacrylate, |
| 0.5 g | of ammonium peroxodisulfate in 15 ml of water, and |
| 20 ml | of cyclohexane | is metered in over 45 minutes. The mixture is then stirred for half an hour. Then 280 ml of water are removed by azeotropic distillation at 75° C., after which, at 70° C., 0.25 g of ethylene glycol diglycidyl ether in 5 ml of water is added. The mixture is then stirred for 2 hours, and the product in the form of a powder is obtained by filtration.

Yield: 402 g of product with a solids content of 96%.

The particle distribution determined by screening analysis and the absorption properties are shown in Table 1.

EXAMPLE 2

The process of Example 1 is carried out but no native maize starch is introduced into the cyclohexane. Instead, 46 g of natural maize starch are metered in with the acrylate solution. The progress of polymerization and the particle structure corresponds to the product prepared as in Example 1.

Yield: 406 g of product with a solids content of 96% by weight.

COMPARATIVE EXAMPLE A

The process of Example 1 is carried out. However, the total amount of natural maize starch (46 g) is initially dispersed in the cyclohexane. After the metering in of the aqueous solution is complete, the reactor contents are highly viscous, hardly stirrable and partially agglomerated. The stirrability improves during the azeotropic removal of water, during which 280 ml of water are removed by distillation.

416 g of a highly porous product which is composed of loosely packed fine particles and has a high coarse particle content (cf. Table 1) are obtained.

EXAMPLE 3

1,800 ml of cyclohexane are introduced into the polymerization apparatus used in Example 1 and heated to 70° C. While stirring at 400 rmp,

| | |
|---|---|
| 4 g | of natural maize starch, |
| 5 g | of sorbitan monolaurate, |
| 2.5 g | of polyethylene glycol with a molecular weight of 1,550, |
| 0.25 g | of ammonium peroxodisulfate in 30 ml of water, and |
| 50 mg | of ethylenediaminetetraacetate (Na salt) | are dispersed. Oxygen is then displaced by nitrogen, and a mixture of

| | |
|---|---|
| 312 g | of acrylic acid, |
| 80 g | of 25 wt. % strength sodium hydroxide solution, |
| 42 g | of natural maize starch, |
| 10 g | of sorbitan monolaurate, |
| 0.1 g | of pentaerythritol triacrylate, |
| 0.3 g | of ammonium peroxodisulfate in 15 ml of water, and |
| 20 ml | of cyclohexane | is metered in over 45 minutes. The mixture is then stirred for half an hour. No adhesion of the polymer particles is found during the polymerization. Then 280 ml of water are removed by azeotropic distillation at 75° C., and 0.25 g of ethylene glycol diglycidyl ether in 5 ml of water is added The mixture is then stirred at 70° C. for 2 hours. 404 g of a fine-particle, compact polymer powder, 95% of which consists of the useful fraction from 90 to 800 μm, are obtained.

EXAMPLE 4

The process of Example 1 is carried out. However, thin-boiling starch with a viscosity of 127 mPa.s (AMISOL ® 05515 supplied by Cerestar) is used.

409 g of a fine-particle product, 96% of which consists of the useful fraction from 90 to 800 μm, are obtained.

COMPARATIVE EXAMPLE B

The process of Example 4 is carried out. However, the total amount of starch (46 g) is initially introduced into the cyclohexane phase. The acrylate solution is metered without starch. After addition of acrylate is complete, the reaction mixture is highly viscous, and the polymer particles agglomerate.

396 g of a coarse-particle product, 100% of which consists of agglomerated particles >2 mm in size, are obtained. The product is comminuted by milling to a particle size <800 μm to determine the absorption properties.

EXAMPLE 5

2,000 ml of cyclohexane are introduced into a 4 l glass reactor equipped with stirrer, nitrogen inlet, metering device, and water trap and heated to 70° C. While stirring at 400 rpm,

| | |
|---|---|
| 5 g | of natural maize starch, |
| 5 g | of sorbitan monolaurate, |
| 2.5 g | of polyethylene glycol with a molecular weight of 1,550, |
| 0.25 g | of ammonium peroxodisulfate in 8 ml of water, and |
| 50 ml | of ethylenediaminetetraacetate (Na salt) in 8 ml of water | are dispersed. Oxygen is then displaced by nitrogen, and a mixture of

| | |
|---|---|
| 312 g | of acrylic acid, |
| 480 g | of 25 wt. % strength sodium hydroxide solution, |
| 70 g | of natural maize starch, |
| 10 g | of sorbitan monolaurate, |
| 0.1 g | of pentaerythritol triacrylate, |
| 0.3 g | of ammonium peroxodisulfate in 15 ml of water, and |
| 20 ml | of cyclohexane | is metered in over 45 minutes. The mixture is then stirred for half an hour. Then 330 ml of water are removed by azeotropic distillation at 75° C., after which, at 70° C., 0.25 g of ethylene glycol diglycidyl ether in 8 ml of water is added. The mixture is then stirred for 2 hours, and the product, which is in the form of a powder and consists of compact, porous particles, is isolated by filtration.

Yield: 455 g of product.

EXAMPLE 6

The process of Example 5 is carried out. However, the total amount of starch (75 g) is metered in with the acrylate phase. The starch content in the dried polymer powder (yield 460 g) is 16 per cent by weight, as in Example 5.

COMPARATIVE EXAMPLE C

The process of Example 5 is carried out. However, the total amount of starch (75 g) is employed in the cyclohexane phase. After the metering in of the aqueous solution is complete, the reaction mixture is highly viscous and only partly mixed. The polymer particles agglomerate. The agglomeration diminishes during the azeotropic removal of water. After removal of 330 ml of water by distillation and crosslinking with 0.25 g of ethylene glycol diglycidyl ether, 440 g of a product in the form of a powder are obtained.

EXAMPLE 7

| | |
|---|---|
| 620 kg | of cyclohexane, |
| 1.3 kg | of natural maize starch, |

-continued

| | |
|---|---|
| 1.4 kg | of sorbitan monolaurate, |
| 0.7 kg | of polyethylene glycol with a molecular weight of 1,550, |
| 20 g | of ethylenediaminetetraacetate, dissolved in 1 l of water, and |
| 50 g | of ammonium peroxodisulfate, dissolved in 1 l of water, | are introduced into a stainless steel polymerization vessel which has a capacity of 1,200 l and is equipped with a two-blade Intermig stirrer, reflux condenser, water trap and introduction devices. The contents of the vessel are heated to 68° C. while stirring and flushed with nitrogen. Over the course of one hour the mixture obtained by neutralization of 95 kg of acrylic acid with 147 kg of 25 wt. % strength sodium hydroxide solution and addition of 25 l of cyclohexane, 4.2 kg of sorbitan monolaurate, 13 kg of natural maize starch and 30 g of trimethylolpropane triacrylate are added while the reaction mixture is stirred at 80 rpm. Also added, metering separately, is an activator solution of 150 g of ammonium peroxodisulfate in 4.5 l of water. After the metering of the acrylate phase and of the activator solution is complete, the mixture is then stirred at 70° C. for half an hour. Then 95 kg of water are removed by azeotropic distillation under 600 hPa, and 78 g of ethylene glycol diglycidyl ether dissolved in 2.5 l of water are added. The mixture is then stirred for 2 hours and then 1,400 g of pyrogenic silica (AEROSIL® 200 supplied by Degussa, D-6000 Frankfurt) in the form of a suspension in 25 l of cyclohexane are added.

The polymer is isolated by filtration from the cyclohexane and dried at 60° C. in a paddle dryer to a residual moisture content of 4.8%. 138 kg of a fine-particle polymer which contains 10.4 percent by weight of starch and 100% of which has a particle size of the useful fraction from 90 to 800 μm.

EXAMPLE 8

The process of Example 5 is carried out. However,

| | |
|---|---|
| 16 g | of natural maize starch, |
| 5 g | of sorbitan monolaurate, |
| 2 g | of polyethylene glycol with a molecular weight of 1,550, |
| 0.25 g | of ammonium peroxodisulfate in 8 ml of water, and |
| 66 ml | of ethylenediaminetetraacetate (Na salt) in 8 ml of water | are dispersed in 2,000 ml of cyclohexane in this case. Oxygen is then displaced by nitrogen, and a mixture of

| | |
|---|---|
| 312 g | of acrylic acid, |
| 480 g | of 25 wt. % strength sodium hydroxide solution, |
| 144 g | of natural maize starch, |
| 10 g | of sorbitan monolaurate, |
| 0.1 g | of trimethylolpropane triacrylate, |
| 0.3 g | of ammonium peroxodisulfate in 15 ml of water, and |
| 20 ml | of cyclohexane | is metered in over 50 minutes. The mixture is then stirred for half an hour. Then 330 ml of water are removed by azeotropic distillation at 75° C., after which, at 70° C., 0.50 g of ethylene glycol diglycidyl ether in 8 ml of water is added. The mixture is then stirred for 2 hours, and the product, which is in the form of a powder and consists of compact, porous particles, is isolated by filtration.

Yield: 545 g of product.

It is evident from Table 1, which follows, that the products according to the present invention are distinguished from the comparative products by a finer particle size, more narrow particle size distribution, smaller content of coarse particles, a distinctly higher final absorptivity and by a distinctly better liquid retention in cellulose-containing diapers, expressed by lower measurements for rewetting.

TABLE 1

| | Screening analysis % by weight | | Absorption capacity g/g of synthetic urine | Absorptivity g/g of synthetic urine | | | Model diaper test | |
|---|---|---|---|---|---|---|---|---|
| | Coarse particles | Useful fraction | | After | | | Rewetting | |
| Ex. | >800 μm | 90–800 μm | | 30 sec. | 300 sec. | Assessment | (g) | Assessment |
| 1 | 8 | 92 | 34 | 16 | 29 | very high | 41 | very good |
| 2 | 10 | 90 | 34 | 13 | 27 | very high | 43 | very good |
| A | 67 | 33 | 33 | 17 | 21 | high | 52 | moderate |
| 3 | 5 | 95 | 44 | 7 | 30 | very high | 42 | very good |
| 4 | 4 | 96 | 37 | 7 | 19 | moderate | 50 | good |
| B | 100 | 0 | 31 | 10 | 16 | moderate | 54 | moderate |
| 5 | 2 | 98 | 36 | 18 | 28 | very high | 46 | good |
| 6 | 3 | 97 | 33 | 13 | 25 | very high | 50 | good |
| C | 6 | 94 | 31 | 19 | 21 | high | 53 | moderate |
| 7 | 0 | 100 | 36 | 14 | 26 | very high | 47 | good |
| 8 | 1 | 99 | 28 | 21 | 25 | very high | 50 | good |

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the U.S. is:

1. A process for the preparation of fine-particle, water-swellable polysaccharide graft copolymers, comprising inverse suspension polymerizing, at a temperature of 40 to 100° C., of 5 to 40 parts by weight of a polysaccharide and 95 to 60 parts by weight of an olefinically unsaturated carboxylic acid, wherein in said inverse suspension polymerizinq, an aqueous phase comprising said olefinically unsaturated carboxylic acid and 100 to 75 percent by weight of said polysaccharide is metered into a hydrophobic solvent in which 0 to 25 percent by weight of said polysaccharide is dispersed.

2. The process of claim 1, wherein said polysaccharide is a starch.

3. The process of claim 1, wherein 2 to 20 percent by weight of said polysaccharide is dispersed in said hydrophobic solvent.

4. The process of claim 1, wherein said hydrophobic solvent is an aliphatic or cycloaliphatic hydrocarbon.

5. The process of claim 1, wherein a non-ionic surfactant with a hydrophilic/lipophilic balance of 0.5 to 10 is present during said inverse suspension polymerizing.

6. The process of claim 1, wherein said olefinically unsaturated carboxylic acid is a 50 to 90% neutralized acrylic acid or methacrylic acid.

7. The process of claim 1, further comprising removing a portion of said water and crosslinking after said polymerizing.

8. The process of claim 1, wherein said aqueous phase further comprises a polymerization initiator.

9. The process of claim 1, wherein a second aqueous phase comprising a polymerization initiator is metered into said hydrophobic solvent during said inverse suspension polymerization.

10. A polysaccharide graft copolymer, prepared by a process, comprising inverse suspension polymerizing, at a temperature of 40° to 100° C., 5 to 40 parts by weight of a polysaccharide and 95 to 60 parts by weight of an olefinically unsaturated carboxylic acid, wherein in said inverse suspension polymerizing, an aqueous phase comprising said olefinically unsaturated carboxylic acid and 100 to 75 percent by weight of said polysaccharide is metered into a hydrophobic solvent in which 0 to 25 percent by weight of said polysaccharide is dispersed.

11. The polysaccharide graft copolymer of claim 10, wherein said polysaccharide is a starch.

12. The polysaccharide graft copolymer of claim 10, wherein 2 to 20 percent by weight of said polysaccharide is dispersed in said hydrophobic solvent.

13. The polysaccharide graft copolymer of claim 10, wherein said hydrophobic solvent is an aliphatic or cycloaliphatic hydrocarbon.

14. The polysaccharide graft copolymer of claim 10, wherein a non-ionic surfactant with a hydrophilic/lipophilic balance of 0.5 to 10 is present during said inverse suspension polymerizing.

15. The polysaccharide graft copolymer of claim 10, wherein said olefinically unsaturated carboxylic acid is a 50 to 90% neutralized acrylic acid or methacrylic acid.

16. The polysaccharide graft copolymer of claim 10, further comprising removing a portion of said water and crosslinking after said polymerizing.

17. The polysaccharide graft copolymer of claim 10, wherein said aqueous phase further comprises a polymerization initiator.

18. The polysaccharide graft copolymer of claim 10, wherein a second aqueous phase comprising a polymerization initiator is metered into said hydrophobic solvent during said inverse suspension polymerization.

19. The process of claim 1, wherein the aqueous phase is metered dropwise or portionwise into the hydrophobic solvent.

20. The process of claim 19, wherein the aqueous phase is metered into the hydrophobic solvent over a period of time of from 0.5 to 4 hours while constantly stirring the hydrophobic solvent.

21. The process of claim 20, wherein after the metering of the aqueous phase is complete the reaction mixture is maintained at the reaction temperature with continued stirring for an additional 0.1 to 1 hour.

22. The polysaccharide graft copolymer of claim 10, wherein the aqueous phase is metered dropwise or portionwise into the hydrophobic solvent.

23. The polysaccharide graft copolymer of claim 22, wherein the aqueous phase is metered into the hydrophobic solvent over a period of time of from 0.5 to 4 hours while constantly stirring the hydrophobic solvent.

24. The polysaccharide graft copolymer of claim 23, wherein after the metering of the aqueous phase is complete the reaction mixture is maintained at the reaction temperature with continued stirring for an additional 0.1 to 1 hour.

* * * * *